US012752633B2

(12) United States Patent
Wagner

(10) Patent No.: US 12,752,633 B2
(45) Date of Patent: Oct. 6, 2026

(54) TRANSPORTATION SYSTEM

(71) Applicant: Jimmy Wagner, Brooklyn, NY (US)

(72) Inventor: Jimmy Wagner, Brooklyn, NY (US)

( * ) Notice: Subject to any disclaimer, the term of this patent is extended or adjusted under 35 U.S.C. 154(b) by 403 days.

(21) Appl. No.: 18/441,690

(22) Filed: Feb. 14, 2024

(65) Prior Publication Data

US 2024/0182189 A1 Jun. 6, 2024

Related U.S. Application Data

(63) Continuation-in-part of application No. 17/588,341, filed on Jan. 31, 2022, now abandoned.

(60) Provisional application No. 63/235,914, filed on Aug. 23, 2021.

(51) Int. Cl.

| | |
|---|---|
| ***B60L 13/10*** | (2006.01) |
| ***B60L 13/03*** | (2006.01) |
| ***B60L 13/04*** | (2006.01) |
| ***B64G 1/00*** | (2006.01) |
| ***B64G 99/00*** | (2009.01) |
| ***H02K 41/02*** | (2006.01) |
| ***H02N 15/00*** | (2006.01) |

(52) U.S. Cl.

CPC ............... *B60L 13/10* (2013.01); *B60L 13/03* (2013.01); *B60L 13/04* (2013.01); *B64G 1/002* (2013.01); *B64G 99/00* (2022.08); *H02K 41/02* (2013.01); *H02N 15/00* (2013.01)

(58) Field of Classification Search

CPC .......... B60L 13/04; B60L 13/10; B60L 13/06; B60L 13/03; B61B 13/08; B61B 13/10; H02N 15/00; E01B 25/305; E01B 25/30; H02K 41/02

See application file for complete search history.

(56) References Cited

U.S. PATENT DOCUMENTS

| | | | | |
|---|---|---|---|---|
| 3,774,542 | A * | 11/1973 | Walsh | B61C 11/06 104/93 |
| 5,433,155 | A * | 7/1995 | O'Neill | B61B 13/10 104/282 |
| 10,308,135 | B2 * | 6/2019 | Henderson | B60L 13/003 |
| 10,322,729 | B2 * | 6/2019 | Suppes | B64C 39/022 |

(Continued)

FOREIGN PATENT DOCUMENTS

| | | | | |
|---|---|---|---|---|
| CN | 102577054 | A * | 7/2012 | H02K 41/031 |
| CN | 103818267 | A * | 5/2014 | B61B 13/10 |

(Continued)

*Primary Examiner* — Cheng Lin

(74) *Attorney, Agent, or Firm* — Patent 360; Barry Choobin

(57) ABSTRACT

A transportation system for transporting cargo and passengers. The transportation system includes a tunnel of a length enough for desired acceleration or deceleration of the vehicle. The tunnel includes a plurality of sections joined together to form the tunnel. Each section includes space rings. The transportation system further includes a vehicle. The vehicle includes a carrier that can be mounted within the tunnel and the carrier can move within the tunnel. The carrier includes mobile rings. Respective driving units can cause expansion and contraction of the mobile rings and space rings. The direction of flow of current in the mobile ring and the space ring, and the change in sizes of the mobile ring and the space ring results in electromotive forces that accelerate or decelerate the vehicle.

6 Claims, 10 Drawing Sheets

(56) References Cited

U.S. PATENT DOCUMENTS

| | | | | |
|---|---|---|---|---|
| 2007/0089636 | A1* | 4/2007 | Guardo | B60L 13/10 104/281 |
| 2011/0100251 | A1* | 5/2011 | Zheng | B61B 13/08 104/284 |
| 2016/0229416 | A1* | 8/2016 | Bambrogan | E02D 29/04 |
| 2018/0057018 | A1* | 3/2018 | Suppes | B61C 13/04 |
| 2019/0210471 | A1* | 7/2019 | Janzen | B60W 40/06 |
| 2023/0055815 | A1* | 2/2023 | Wagner | B64G 1/002 |
| 2023/0399030 | A1* | 12/2023 | Rudolf | B61B 13/10 |

FOREIGN PATENT DOCUMENTS

| | | | | | |
|---|---|---|---|---|---|
| CN | 107933579 | A | * | 4/2018 | B61B 13/10 |
| CN | 109552066 | A | * | 4/2019 | B60L 13/04 |
| ES | 2677496 | A1 | * | 8/2018 | B61B 13/08 |
| FR | 2756985 | A1 | * | 6/1998 | F41B 6/006 |
| KR | 20100079365 | A | * | 7/2010 | B61B 13/10 |
| KR | 101015170 | B1 | * | 2/2011 | B61B 13/08 |

* cited by examiner

130

TRANSPORTATION SYSTEM

CROSS-REFERENCE TO RELATED APPLICATIONS

This application is a continuation in part of a U.S. patent application Ser. No. 17/588,341 filed on Jan. 31, 2022, which claims priority from a U.S. provisional Patent Appl. No. 63/235,914, filed on Aug. 23, 2021, both of which are incorporated herein by reference in its entirety.

FIELD OF INVENTION

The present invention relates to a transportation system, and more particularly, the present invention relates to a transportation system for carrying a vehicle between locations in the vacuum of outer space.

BACKGROUND

Transportation systems are an essential part and a lifeline of the modern world. The transportation system is used to carry passengers and objects from one location to another. Different types of transport are used for a variety of purposes. However, a need is always there for a sophisticated transportation system that can operate in a variety of environments. This transportation system is designed for low gravity-no gravity environments located in the vacuum of space.

The terms ship and vehicle are used interchangeably hereinafter.

SUMMARY OF THE INVENTION

The following presents a simplified summary of one or more embodiments of the present invention to provide a basic understanding of such embodiments. This summary is not an extensive overview of all contemplated embodiments and is intended to neither identify critical elements of all embodiments nor delineate the scope of any or all embodiments. Its sole purpose is to present some concepts of one or more embodiments in a simplified form as a prelude to the more detailed description that is presented later.

The principal object of the present invention is therefore directed to a transportation system for propelling ships using electromotive force (EMF).

Another object of the present invention is that the transportation system can handle large amounts of traffic.

It is still another object of the present invention that transportation can be made economical.

It is still another object of the present invention that transportation can be made faster.

It is a further object of the present invention that the transportation system can use solar energy for operation.

In one aspect, disclosed is a transportation system that includes a tunnel that spans between two distant locations and uses electromotive force for propelling ships. The tunnel can be fixed and powered by renewable energy, such as solar energy.

In one implementation, the tunnel can be a C-shape having an open bottom through which the vehicles can be spatially suspended in space.

In one implementation, a control unit can operate the disclosed transportation system. Alternatively, the tunnel can be operated by the incoming/outgoing ship.

In one aspect, disclosed is a transportation system comprising a tunnel. The tunnel is limited in length. The purpose being to effectuate acceleration or deceleration of the vehicle. Once the vehicle is properly accelerated through the tunnel it launches into the vacuum of space at the speed until it decelerates at some distant location via another tunnel or other deceleration method.

In one aspect, a transportation system is disclosed for transporting cargo and passengers. The transportation system includes a tunnel of a length enough to accomplish an acceleration or deceleration necessary to accomplish a journey between the first station and the second station. The tunnel includes a plurality of sections joined together to form the tunnel for the desired length. Each of the sections includes one or more space rings encased with the respective tunnel section. The transportation system further includes a vehicle. The vehicle includes a carrier that can be mounted within the tunnel and the carrier can move within the tunnel. The carrier includes one or more mobile rings and a first driving unit configured to expand and contract the one or more mobile rings. The transportation system uses electromagnetic propulsion to move the vehicle within the tunnel. Once the vehicle exist the tunnel the acceleration and propulsion obtained from the electromagnetic propulsion will be maintained in the vacuum of space without reduction until it arrives at the second space station tunnel wherein in lieu of acceleration the tunnel will now be employed using electromagnetic forces for deceleration.

BRIEF DESCRIPTION OF THE DRAWINGS

The accompanying figures, which are incorporated herein, form part of the specification and illustrate embodiments of the present invention. Together with the description, the figures further explain the principles of the present invention and enable a person skilled in the relevant arts to make and use the invention.

DETAILED DESCRIPTION

The accompanying figures, which are incorporated herein, form part of the specification and illustrate embodiments of the present invention. Together with the description, the figures further explain the principles of the present invention and enable a person skilled in the relevant arts to make and use the invention.

Disclosed is a transport system that can operate in diverse geographies, such as space for the transportation of men and cargo. The disclosed transport system uses electromotive force to push a ship that is mounted to a tunnel of the transport system. The electromotive force is the repelling force of the electric currents traveling in opposite directions. In geographies where there is a vacuum, no resistance is offered to the electromotive forces.

Figure 1:
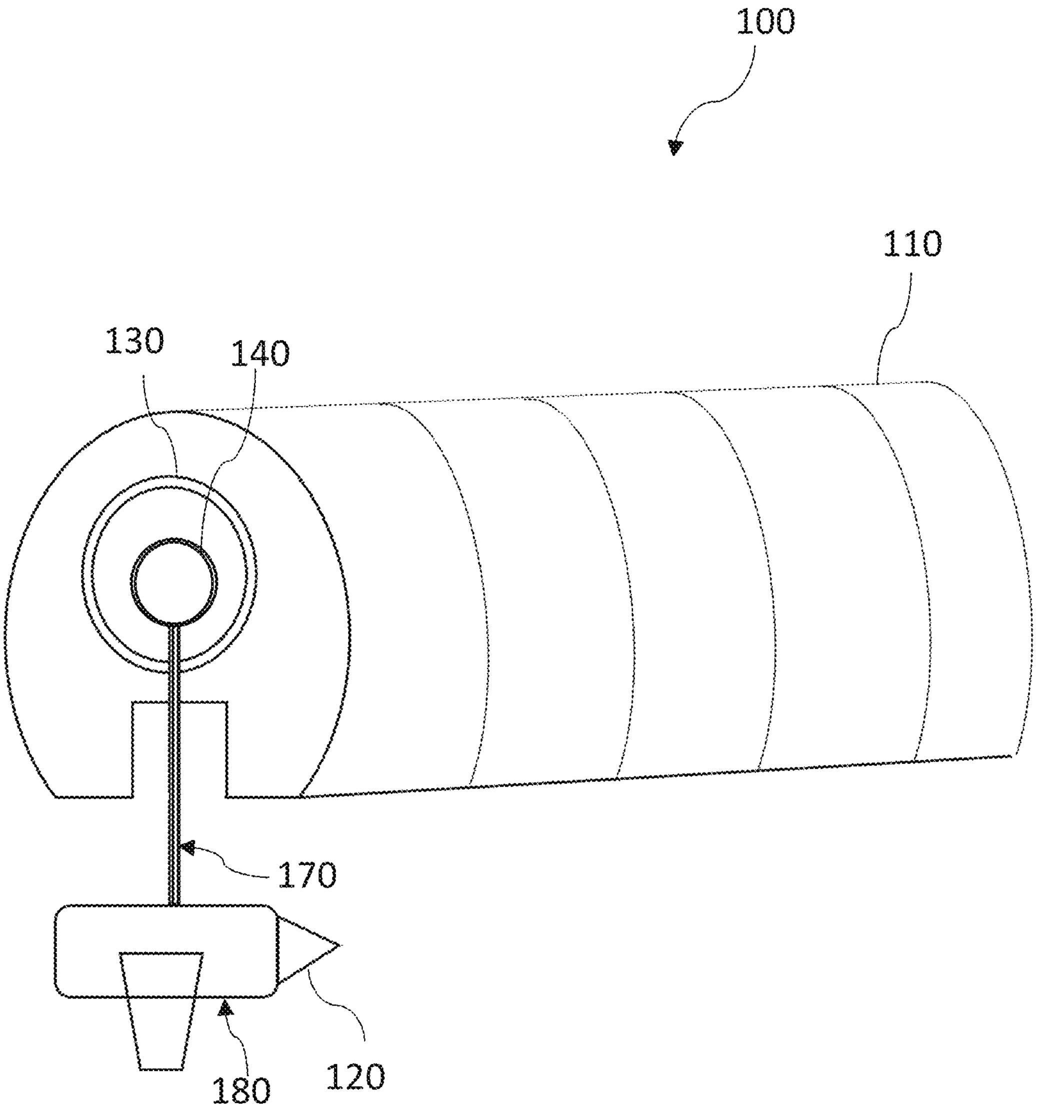
FIG. 1 shows an exemplary embodiment of the transportation system, according to an exemplary embodiment of the present invention.

Referring to FIG. 1 shows an exemplary embodiment of transport system 100 that includes a vehicle 120 suspended from a tunnel 110. Tunnel 110 can include space rings 130. The electromagnetic propulsion of the tunnel can be based on the motion EMF, wherein the tunnel can harness motional EMF and convert it into electromagnetic propulsion.

FIG. 1 also shows a space ring 130 and a mobile ring 140 that can expand and contract in size relative to each other, to generate the electromotive force for accelerating and decelerating of the vehicle. Expansion and contraction of the mobile ring and space ring, and the current flow through the mobile ring and space ring, can be controlled depending on whether they are used to accelerate the vehicle or slow down the vehicle leaving or coming. The mobile rings can be built onto a carrier of the vehicle. The vehicle mounting member 150 can mount the carrier 160 of the vehicle 120 to the tunnel 110.

Figure 2:
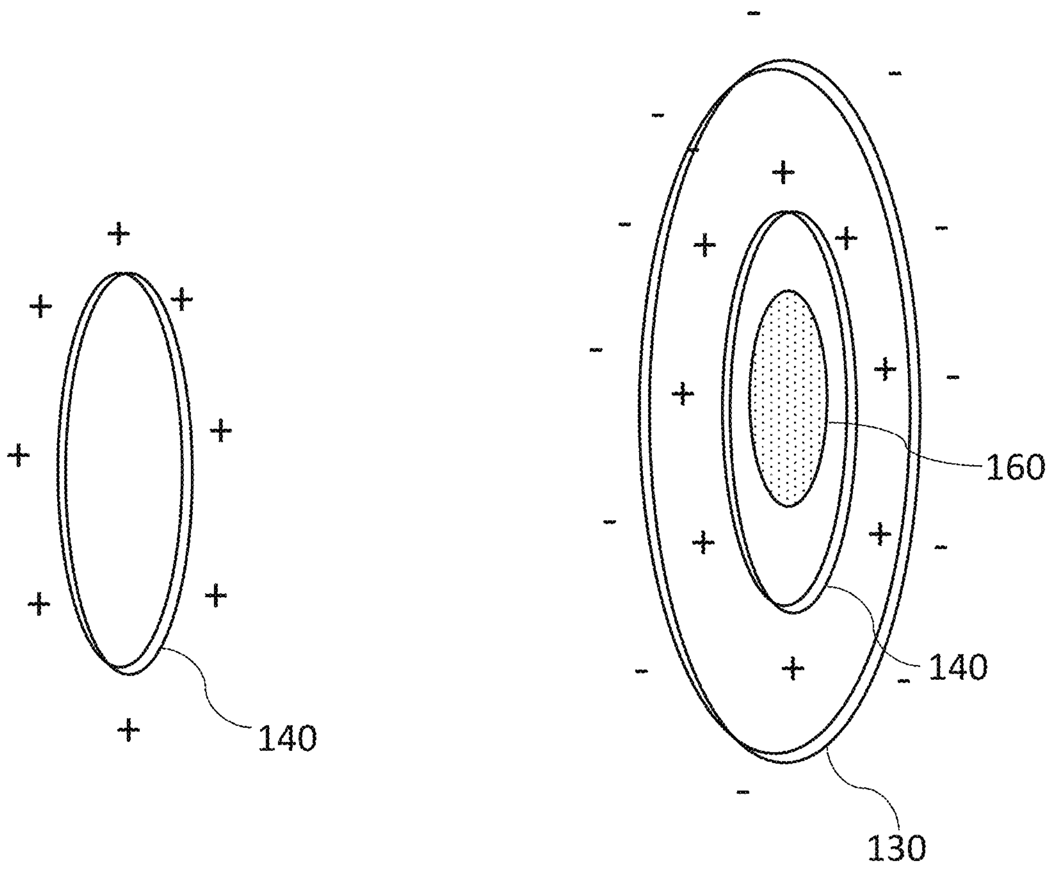
FIG. 2 shows a space ring of the tunnel and a mobile ring, according to an exemplary embodiment of the present invention.

Referring to FIG. 2 which shows the flow of current in the space ring 130, wherein the flow of current in the mobile ring 140 can be opposite to the flow of current in the space ring 130, wherein the opposite charges can propel the ship forward. The change in the size of the mobile ring and the space ring can be proportional to the acceleration or deceleration of the vehicle. The pilots of the vehicle through a control center can change the size of the mobile ring and the space ring, and thus accelerate and decelerate the vehicle.

Figure 3A:
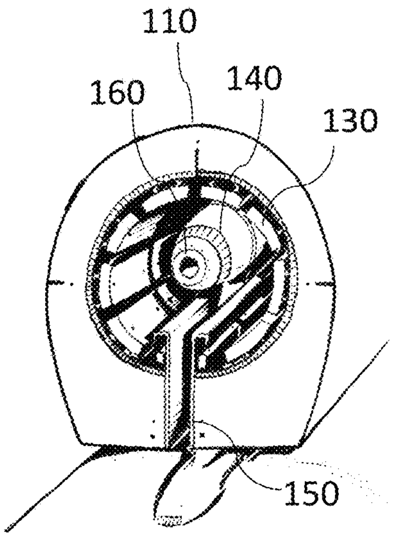
FIGS. 3*a*-3*e* illustrate a carrier of a ship within a section of the tunnel, the carrier having the mobile ring, the mobile ring and the space ring expanding and contracting for accelerating and moving the ship within the tunnel, according to an exemplary embodiment of the present invention.
Figure 3B:
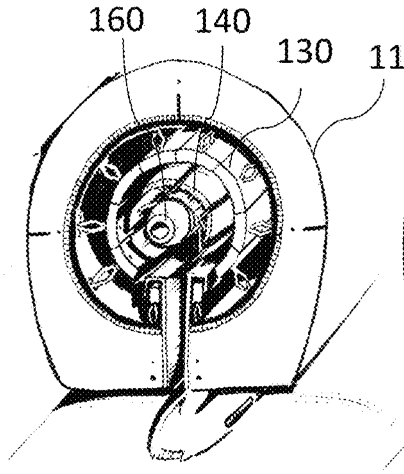
Figure 3C:
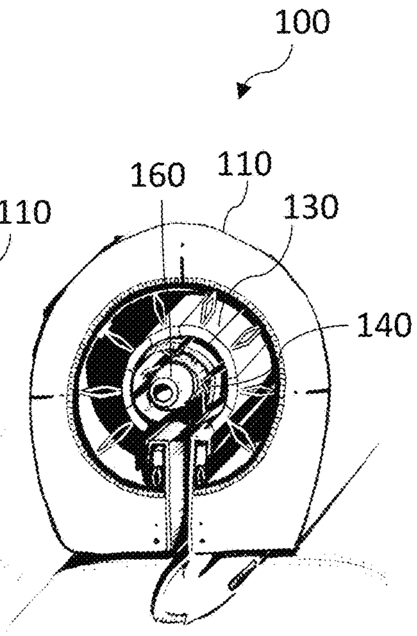
Figure 3D:
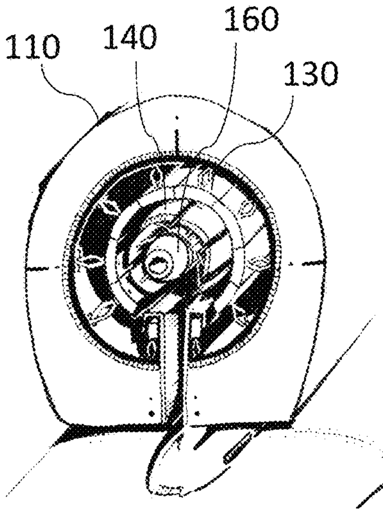
Figure 3E:
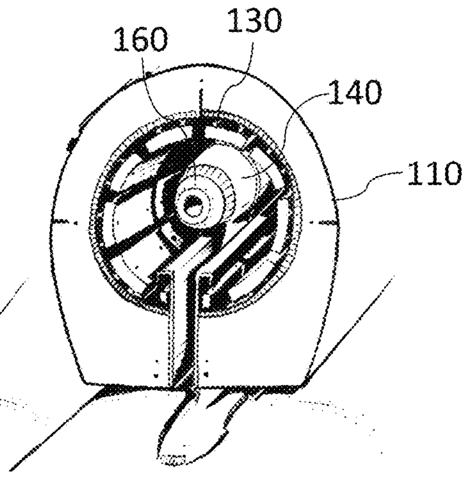

Referring to FIGS. 3*a*-3*e* which illustrate an exemplary embodiment of the present invention. The drawings only show carrier 160 of the vehicle, carrier 160 includes mobile rings 140 and these mobile rings can be operated by the transport system and/or the ship. FIGS. 3*a*-3*e* show a cycle for acceleration, in FIG. 3*a* the mobile rings are in a contracted state and the space rings are in expanded state. FIG. 3*b* shows the mobile rings expanding and the space rings contracting, and the mobile rings further expand and space rings contract in FIG. 3*c* and, and then the mobile rings start to contract while the space rings start expanding in FIG. 3*d* and then back to the as in FIG. 3*a*, shown in FIG. 3*e*. As can be seen in the drawings, the state of the system in FIGS. 3*a* and 3*e* are the same, which indicates the completion of one cycle. Such cycles can be repeated at a desired frequency to accelerate and decelerate the vehicle. The mobile rings and the space rings can expand and contract in synchronization, as shown in the drawings. The movement of the mobile rings and space rings can be synchronized by the transport system having a control unit. In FIG. 3*c*, the mobile ring and the space ring are closest to each other. The space ring and the mobile ring can be made from elongated planks that together form a hollow cylindrical profile when the respective rings are in fully contracted state. Each plank is coupled to a driving member for extending and retracting a respective plank. The different driving members of a driving unit work in synchronization so that the rings can expand and contract. For example, drawings show the space rings connected to a scissor type driving member like a scissor type jack. The two arms of the scissor type driving member when moves away from each other, the space ring is expanded. Similarly, when the two scissor arms of the driving member comes closer to each other, the space rings contracts. It is to be understood that any mechanism including electrical, mechanical, hydraulic, alone in combinations, can be used without departing from the scope of the present invention. Also, the driving mechanism used for planks of the mobile rings can be same or different to the driving mechanism used from the space rings.

Figure 4A:
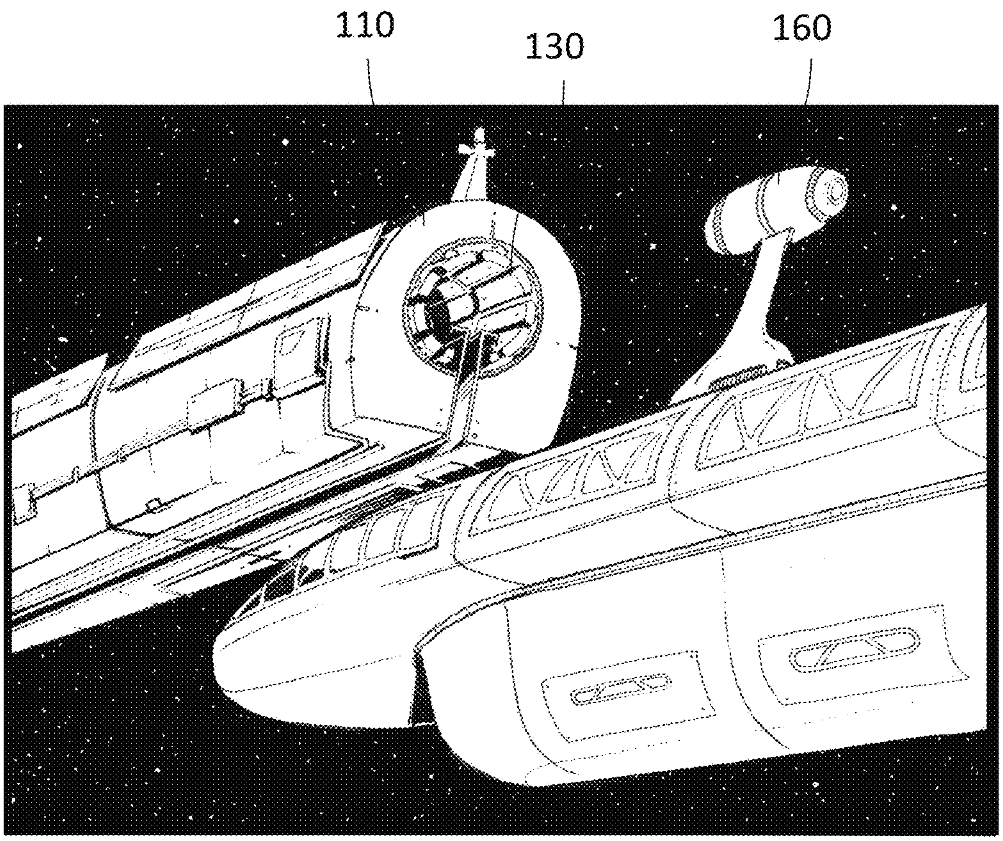
FIG. 4*a* illustrates a ship boarding the tunnel, according to an exemplary embodiment of the present invention.
Figure 4B:
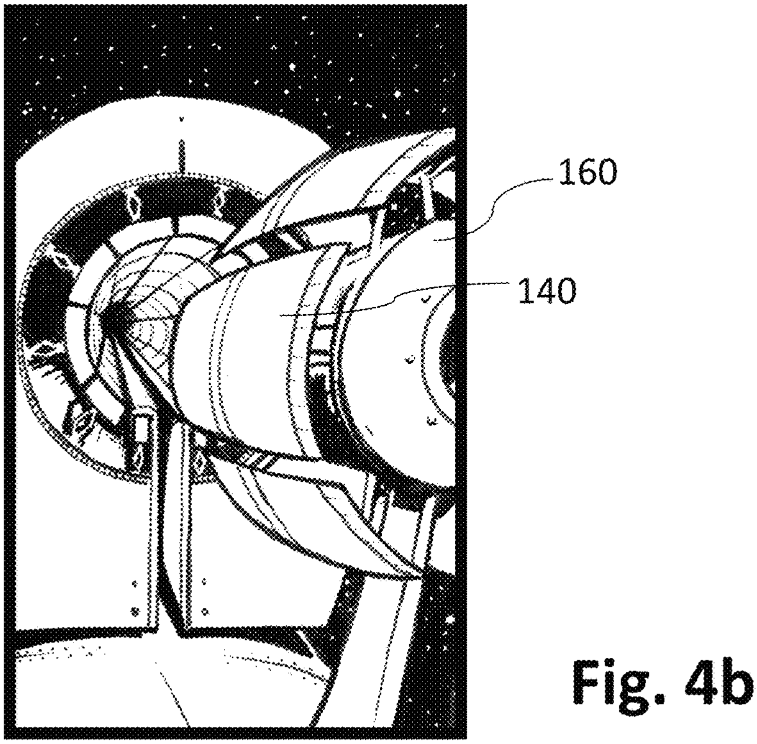
FIG. 4*b* shows a closer view of the ship boarding the tunnel, according to an exemplary embodiment of the present invention.

FIGS. 4*a* and 4*b* show boarding of a ship into a tunnel, wherein the carrier with mobile rings enters the tunnel. The ship can be mounted within the tunnel using some suitable method, such as trains mounted over the track.

Figure 5:
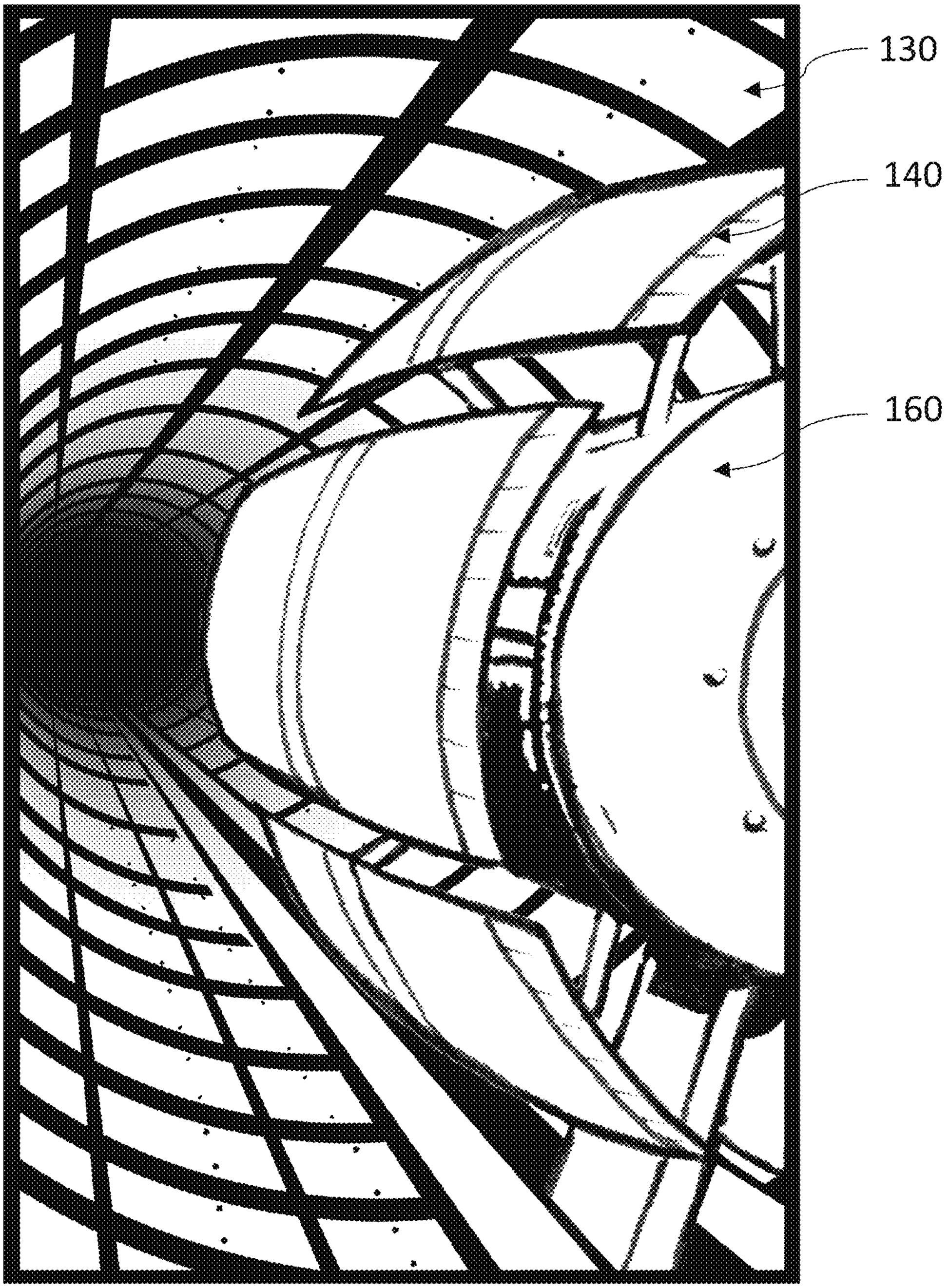
FIG. 5 illustrates an inner sectional view of the tunnel having an onboard ship, according to an exemplary embodiment of the present invention.

FIG. 5. Shows an enlarged and closer view showing the interaction between the tunnel's space ring 130 and the vehicle 120 mounted carrier 160 having the mobile rings 140.

Figure 6A:
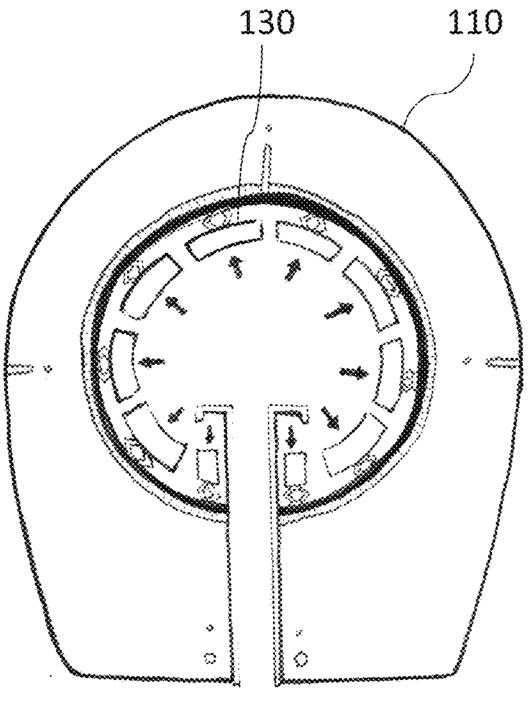
FIG. 6*a* shows the space ring in an expanded state and FIG. 6*b* shows the space ring in a contracted state, according to an exemplary embodiment of the present invention.
Figure 6B:
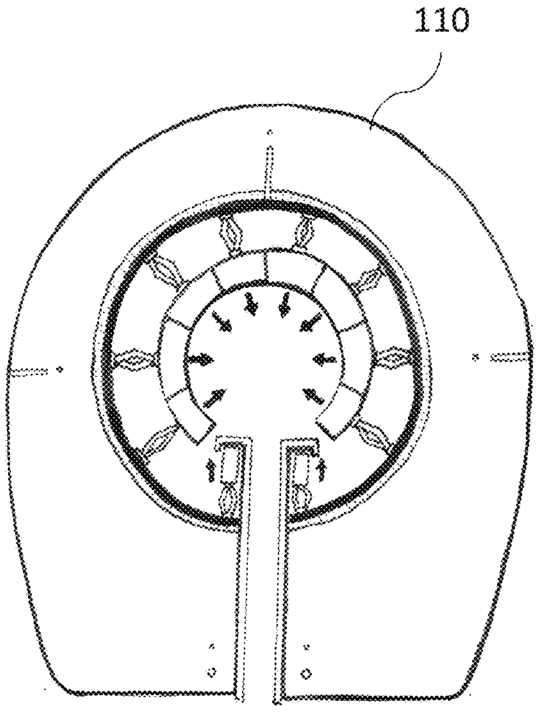
Figure 7A:
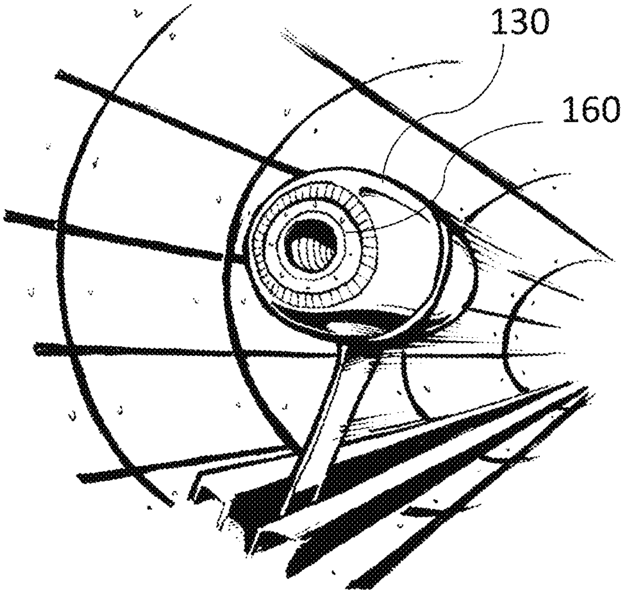
FIG. 7*a* shows the mobile ring being operated for an acceleration or deceleration process and FIG. 7*b* shows the gradual expansion necessary for the proper acceleration or deceleration process, according to an exemplary embodiment of the present invention.
Figure 7B:
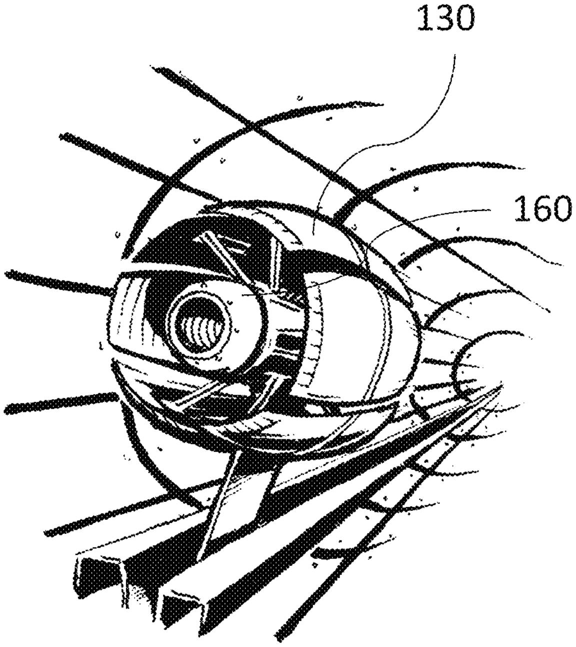
Figure 8:
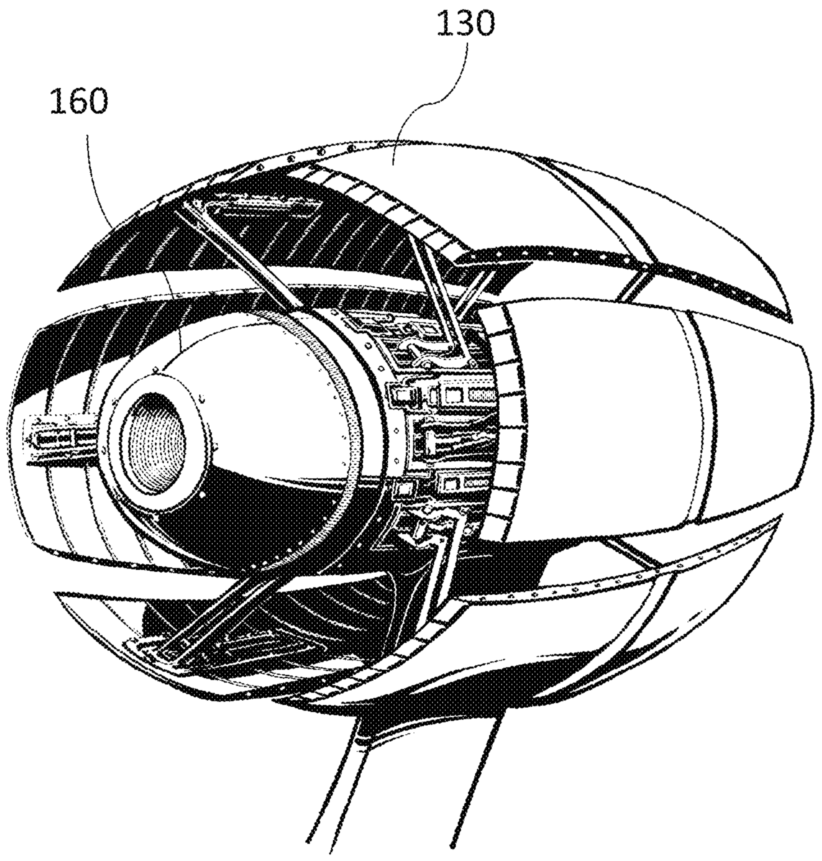
FIG. 8 shows a carrier of the ship having the mobile rings in an expanded state, according to an exemplary embodiment of the present invention.

FIGS. 6*a* and 6*b* further illustrate the expansion and contraction of the space rings 130. In contracted state, the planks are closely placed with each other forming a hollow cylinder. In the expanded state, planks are space apart from adjacent planks. FIGS. 7*a* and 7*b* illustrate the movement of carrier within the tunnel. In FIG. 7*a* the mobile rings are in a contracted state and are shown to be expanding in FIG. 7*b*. It is to be noted that transportation systems may allow only the mobile rings to expand. Also, space rings can be static and do not change in size, and such implementation is also within the scope of the present invention. The control unit can control the change in size and current flow in the respective mobile rings and space rings. FIG. 8 shows a close-up view further illustrating the carrier having the mobile rings in the expanded state and the driving members operating the planks of the mobile ring. Planks connected to driving members can be seen, that can extend and retract the planks. The planks negative or positive EMF field are the accelerating or decelerating fields interacting with space ring 130. The plates at the end of the plank will be opposite charge of the space tunnel.

Figure 9:
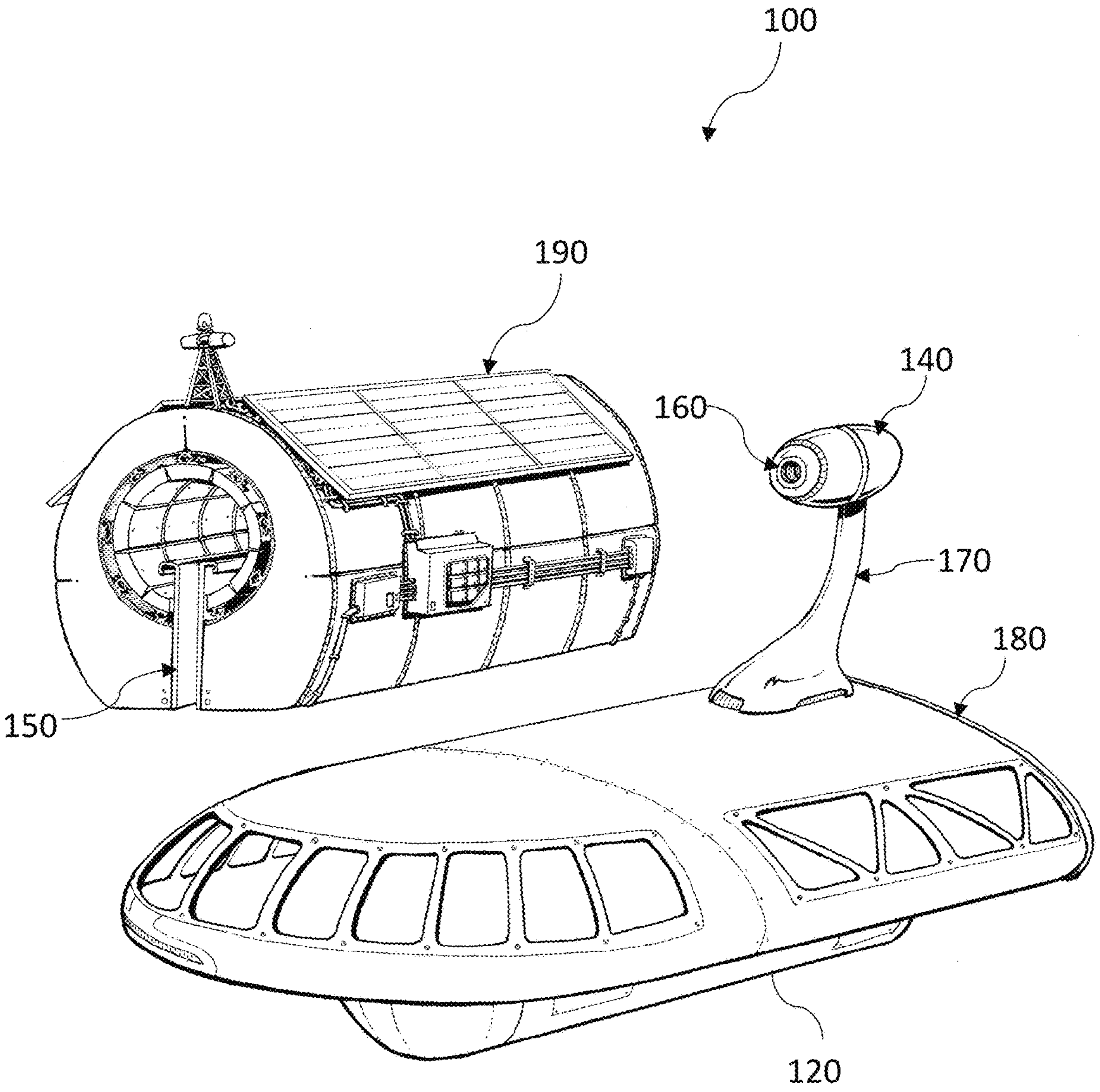
FIG. 9 illustrates a ship and a section of the tunnel, according to an exemplary embodiment of the present invention.
Figure 10:
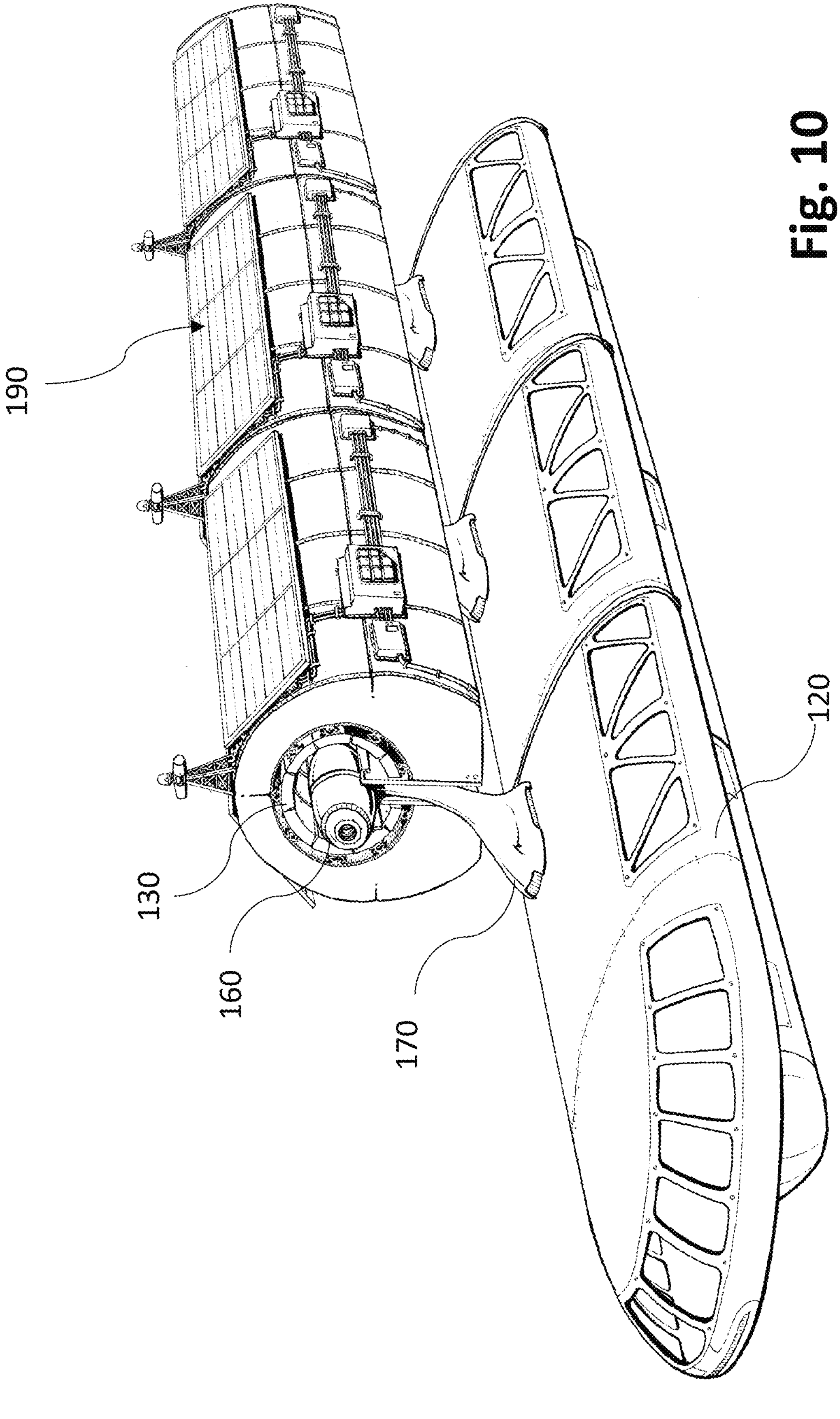
FIG. 10 illustrates the transportation system according to an exemplary embodiment of the present invention.

FIG. 9 illustrates the transportation system showing a section of the tunnel and a ship mounted to the tunnel section. Multiple such sections of the tunnel can be joined together to form a path, i.e., a length of tunnel needs to be created for the desired effects of acceleration or deceleration. A long tunnel to be created when high acceleration is desirable. However, a shorter tunnel for an initial acceleration in the vacuum of space is needed. For example, FIG. 10 shows the ship mounted within a tunnel and three sections of the tunnel are shown joined together. Multiple such sections of the tunnel can be built and installed to form an elongated tunnel that extends long enough to help the ship accelerate to substantial speeds without the necessity of combustible fuels or nuclear propulsion, thereby making a system for travel in the vacuum of space safer and more sustainable. Also, in vacuum, such short tunnels can be provided at distant locations, and the ship can be accelerated and decelerated on its journey through such tunnel stations, acting like charging points.

FIG. 10 illustrates the transportation system 100. The tunnel of the transportation system may also include solar panels 190 that can be used to power the transportation system. The ship of the transportation system includes a body 180, a carrier 160, and an arm 170, wherein the carrier is coupled to the body through the arm. The arm can slide within the vehicle mounting member and the tunnel push out the vehicle at accelerated speeds or cause the same to be decelerated depending on operator preference.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A transportation system comprising:
- a tunnel comprising a plurality of tunnel sections joined together to form the tunnel, each tunnel section comprising:
  - one or more space rings encased with the tunnel section; and
- a vehicle comprising:
  - a body;
  - an arm; and
  - a carrier, the arm connects the carrier to the body, the carrier is configured to move within the one or more space rings, the carrier comprises:
    - one or more mobile rings; and
    - a first driving unit configured to expand and contract the one or more mobile rings,
- wherein the transportation system is configured to move the vehicle using electromagnetic propulsion.

2. The transportation system according to claim 1, wherein the electromagnetic propulsion is based on motional electromotive force (EMF), wherein current flowing in the one or more space rings is in a direction that is opposite to a direction of a current flowing in the one or more mobile rings, and where the expansion and contraction of the one or more mobile rings result in the motional electromotive force (EMF).

3. The transportation system according to claim 2, wherein a change in a size of each of the one or more mobile rings is proportional to acceleration or deceleration of the vehicle.

4. A method for transportation commission:

providing a transportation system comprising:
- a tunnel comprising a plurality of tunnel sections joined together to form the tunnel, each tunnel section comprising:
  - one or more space rings encased with the tunnel section; and
- a vehicle comprising:
  - a body;
  - an arm; and
  - a carrier, the arm connects the carrier to the body, the carrier is configured to move within the one or more space rings, the carrier comprises:
    - one or more mobile rings; and
    - a first driving unit configured to expand and contract the one or more mobile rings,
- wherein the transportation system is configured to move the vehicle using electromagnetic propulsion; and propelling the vehicle by the electromagnetic propulsion.

5. The method according to claim 4, wherein the electromagnetic propulsion is based on motional electromotive force (EMF), wherein current flowing in the one or more space rings is in a direction that is opposite to a direction of a current flowing in the one or more mobile rings, and where the expansion and contraction of the one or more mobile rings result in the motional electromotive force (EMF).

6. The method according to claim 5, wherein a change in a size of each of the one or more mobile rings is proportional to acceleration or deceleration of the vehicle.

* * * * *